US012723981B2

(12) United States Patent
Van Mourik

(10) Patent No.: US 12,723,981 B2
(45) Date of Patent: Sep. 1, 2026

(54) FEMTOSECOND PULSED MICROSCOPY

(71) Applicant: FLASH PATHOLOGY B.V., Amsterdam (NL)

(72) Inventor: Frank Van Mourik, Uithoorn (NL)

(73) Assignee: FLASH PATHOLOGY B.V., Amsterdam (NL)

( * ) Notice: Subject to any disclaimer, the term of this patent is extended or adjusted under 35 U.S.C. 154(b) by 57 days.

(21) Appl. No.: 18/704,621

(22) PCT Filed: Oct. 25, 2022

(86) PCT No.: PCT/NL2022/050602
§ 371 (c)(1),
(2) Date: Apr. 25, 2024

(87) PCT Pub. No.: WO2023/075597
PCT Pub. Date: May 4, 2023

(65) Prior Publication Data
US 2025/0003876 A1 Jan. 2, 2025

(30) Foreign Application Priority Data
Oct. 28, 2021 (NL) .................................... 2029545

(51) Int. Cl.
*G01N 21/63* (2006.01)
*G01N 21/64* (2006.01)
*G02B 21/00* (2006.01)

(52) U.S. Cl.
CPC ....... *G01N 21/636* (2013.01); *G01N 21/6458* (2013.01); *G01N 21/6486* (2013.01); *G02B 21/0076* (2013.01); *G02B 21/0084* (2013.01)

(58) Field of Classification Search
CPC ............ G01N 21/636; G01N 21/6458; G01N 21/6486; G01N 2201/0696;
(Continued)

(56) References Cited

U.S. PATENT DOCUMENTS

2003/0218114 A1* 11/2003 Suzuki .................. G02B 21/16 250/201.3
2011/0224519 A1 9/2011 Adachi et al.
(Continued)

FOREIGN PATENT DOCUMENTS

CH 694975 A5 * 10/2005 ............ G01S 17/10
CN 111650404 A 9/2020
(Continued)

OTHER PUBLICATIONS

Kerse, Can, et al. "Efficient, high-speed ablation of soft tissue with few-microjoule, femtosecond pulse bursts." arXiv preprint arXiv: 1410.6730 (2014). (Year: 2014).*
(Continued)

*Primary Examiner* — Tarifur R Chowdhury
*Assistant Examiner* — Kaitlyn E Kidwell
(74) *Attorney, Agent, or Firm* — Steven M. Koehler; Westman, Champlin & Koehler, P.A.

(57) ABSTRACT

Systems and methods are disclosed for femtosecond-pulsed microscopy, preferably non-linear microscopy. The microscopy system comprises a laser source for providing a pulse train comprising a series of femtosecond pulses and a pulse picker for selecting one or more bursts of pulses from the pulse train. Each of the one or more bursts comprises a plurality of consecutive pulses. The one or more bursts may comprise less than 25%, e.g., less than 15%, of the pulses of the pulse train. The microscopy system further comprises optics for illuminating a sample with the one or more bursts of pulses, and a detector for detecting signals caused by interaction of the one or more bursts of pulses with the sample. The detector may be configured to generate a single signal for each of the one or more bursts.

20 Claims, 8 Drawing Sheets

(58) Field of Classification Search
CPC ............ G02B 21/0076; G02B 21/0084; G02B 21/002; G02B 2207/114; G02B 2207/113; A61B 5/0071; A61B 5/0062
See application file for complete search history.

(56) References Cited

U.S. PATENT DOCUMENTS

| | | | | |
|---|---|---|---|---|
| 2014/0369370 | A1 | 12/2014 | Clowes et al. | |
| 2015/0011406 | A1 * | 1/2015 | Rich | G01N 33/582 435/5 |
| 2016/0238532 | A1 | 8/2016 | Freudiger et al. | |
| 2018/0106729 | A1 | 4/2018 | Balu et al. | |
| 2020/0309701 | A1 * | 10/2020 | Tsyboulski | G02B 27/283 |
| 2022/0146427 | A1 | 5/2022 | Yoo et al. | |

FOREIGN PATENT DOCUMENTS

| | | | | |
|---|---|---|---|---|
| EP | 2365338 | A1 | 9/2011 | |
| JP | 2003344776 | A | 12/2003 | |
| JP | 2009229715 | A | 10/2009 | |
| JP | 2011515588 | A | 5/2011 | |
| JP | 2018043034 | A | 3/2018 | |
| JP | 2021520795 | A | 8/2021 | |
| WO | WO-2011163353 | A2 * | 12/2011 | G01J 3/10 |
| WO | 2014205413 | A2 | 12/2014 | |
| WO | 2021210768 | A1 | 10/2021 | |

OTHER PUBLICATIONS

Bakker et al. “Intravital Deep-Tumor Single-Beam 3-Photon, 4-Photon, and Harmonic Microscopy”, eLife, 2022, 23 pages, vol. 11, No. e63776.

Masters et al. “Mitigating Thermal Mechanical Damage Potential During Two-Photon Dermal Imaging”, Journal of Biomedical Optics, Nov./Dec. 2004, pp. 1265-1270, vol. 9, No. 6.

International Search Report and Written Opinion in corresponding International Application No. PCT/NL2022/050602 dated Nov. 24, 2022.

Office Action in corresponding Japanese Patent Application Serial No. 2024-525748 dated Jun. 11, 2026.

* cited by examiner 100
118
130
controller
det.
114
116
det.
objective
108
det.
112
110
113
115
106
2D raster
scanner
102
pulsed laser
pulse picker
126
104
122
142
acoustic
source
AOM
140
124
122
126
146
144 rel. amplitude [%]
time [ns]
200
202
204
212
214
222
224
232
234

FEMTOSECOND PULSED MICROSCOPY

CROSS-REFERENCE TO RELATED APPLICATIONS

This application is a Section 371 National Stage Application of International Application No. PCT/NL2022/050602, filed Oct. 25, 2022 and published as WO 2023/075597 A1 on May 4, 2023, in English.

FIELD OF THE INVENTION

The invention relates to non-linear microscopy; and, in particular, though not exclusively, to methods and systems for femtosecond-pulsed microscopy and to a computer program product enabling a computer system to perform such methods.

BACKGROUND OF THE INVENTION

During surgery and endoscopic procedures, it may be desirable to quickly examine a tissue sample, e.g. a biopsy, with a microscope. This way, a physician may e.g. determine whether a tumour excision surface is clean, or that excision of a larger volume is required. In some cases, a physician may even want to inspect a living sample which is still part of a subject (e.g., a patient). In these cases, preparation of the sample by e.g. fixation, staining, or other treatments common in e.g. pathology practice, is typically impossible or at least undesirable. It may furthermore be required that the tissue sample is not damaged during the examination, e.g. because the tissue is still living, or so that it may be used later for other examination purposes.

However, these requirements lead to various challenges in obtaining a good microscopy image. For example, it is typically difficult to obtain a sufficient contrast without staining, in particular in a short time frame, and even more so if the tissue is not fixated or even alive.

Various options may be used to increase the contrast when staining or labelling is not an option, such as multi-photon microscopy and non-linear optical microscopy. Non-linear optical microscopy includes the detection of higher-order signals such as second and third harmonics. However, higher-order signals require either a high peak light intensity or a long integration time (and hence a long acquisition time). A high peak light intensity risks damaging the tissue, e.g., through non-linear damage mechanisms like multi-photon ionization, or even cavitation. When using lower peak power, the required increase in integration time leads to higher total light doses and a risk of (over)heating the tissue. A long acquisition time is not compatible with the requirement of fast image acquisition which is necessary for fast decision-making at the bed side. Moreover, a long acquisition time may lead to motion artifacts, in particular when the sample is not fixated.

There is therefore a need in the art for a fast microscopy system with a large field of view with sub-micron resolution that reduces or at least mitigates the aforementioned drawbacks.

SUMMARY OF THE INVENTION

It is an object of embodiments in this disclosure to provide a microscopy system and method that allow fast image acquisition (preferably 1 μs or less dwell time per pixel) with a large field of view (at least 0.5×0.5 $mm^2$, preferably at least 1×1 $mm^2$) with sub-micron resolution for samples with no or little preparation. The system and method may use non-linear signals such as second and third harmonics, autofluorescence, and multi-photon interactions to provide contrast. The system and method are preferably non-destructive, i.e., they cause no or only minimal damage to the sample.

In a first aspect, the invention may relate to a microscopy system, preferably a non-linear microscopy system. The microscopy system comprises a laser source for providing a pulse train comprising a series of femtosecond pulses and a pulse picker for selecting one or more bursts of pulses from the pulse train. Each of the one or more bursts comprises a plurality of consecutive pulses. The one or more bursts may comprise less than 25%, e.g., less than 15%, of the pulses of the pulse train. The microscopy system further comprises optics for illuminating a sample with the one or more bursts of pulses, and a detector for detecting signals caused by interaction of the one or more bursts of pulses with the sample. The detector may be configured to generate a single signal for each of the one or more bursts.

The femtosecond pulses may be high-intensity pulses. For example, in the case of microscopy with a high numerical aperture microscope objective, the pulses may have an energy of at least 0.1 nJ per pulse, preferably at least 1 nJ per pulse, more preferably at least 2 nJ per pulse, measured at the sample. For pulses with the same pulse length, a higher energy per pulse is associated with a higher peak light intensity, allowing stronger higher-order signals and hence a higher signal-to-noise ratio. However, the pulse energy may be limited by (non-linear) damage to the sample. Therefore, the pulses may have an energy of at most 10 nJ per pulse, preferably at most 5 nJ per pulse.

In this disclosure, pulse energies refer to pulse energies at the sample, unless expressly specified otherwise.

The pulse length may be less than or equal to 250 fs, preferably less than or equal to 100 fs. Acceptable and optimal values may vary based on specifics of the system, such as numerical aperture, focus size, pulse length, and wavelength. Since, generally, signal quality for the non-linear light-matter interactions in the sample is correlated with peak light intensity, the longer pulses and/or less tightly focused pulses may have a higher pulse energy, and conversely, shorter and/or more tightly focused pulses may have a lower pulse energy.

By using a laser with a high (peak) pulse intensity, high-quality higher-order images may be obtained, precluding the need to combine (e.g., average) several images while still providing sufficient contrast. By selecting a burst with only a few pulses per pixel, overheating of the tissue may be avoided. In a typical embodiment, a raster scanner comprising a continuously moving mirror causes a plurality of pixels to be consecutively exposed to the laser beam. By selecting only a few pulses per pixel (compared to the number of pulses that would have exposed the pixel absent the pulse picker), the exposure time per pixel is limited, reducing motion artifacts, e.g., smearing, due to the continuous motion of the raster scanner.

Moreover, by avoiding the need to combine several images, artifacts due to dynamic behaviour of the sample can be avoided. This is even more relevant for hand-held systems, where a high-frame rate is desired and where the acquisition head may move during image acquisition, making combination of images acquired at different points in time even more difficult. Hand-held scanning devices may perform microscopy in situ, e.g., during surgical and/or endoscopic procedures.

Thus, a microscopy system as described herein may be used as a pathology microscope where the raster scanner and light source are configured to produce sufficient signal, and sufficient dynamic range in the signal, to be able to obtain (pathology) images in a single raster-scan. This way, slow dynamics of the unfixed tissue will not affect the microscopic resolution.

The sample can be an unprepared sample, e.g. a freshly taken biopsy or a living sample, for example during intra-operative imaging.

In some embodiments, the laser may have a wavelength of between 1000-1200 nm, e.g. about 1050 nm. Lasers in this wavelength range can be relatively economical. Additionally, for the detection of third harmonic signals, some optical elements, such as the objective, should generally be suitable for (e.g., transparent to) both to the illumination light and to the third harmonic signal, which has a wavelength of one-third the illumination light. For example, when using a laser source with a wavelength of 1050 nm, optical elements suitable for wavelength between 350 nm and 1050 nm can be used. Optical elements, e.g., high-numerical-aperture objectives, suitable for wavelengths≥350 nm are typically more economical than those suitable for shorter wavelength, e.g., <300 nm.

Moreover, light absorption by water has a local minimum around 1050 nm and becomes substantially higher for longer wavelengths. As biological samples typically contain a significant amount of water, minimising energy absorption by water reduces tissue heating. At shorter wavelengths, the third-harmonics signal shifts into the ultraviolet end of the spectrum, leading again to a higher absorption by the sample, and hence to a weaker signal.

In other embodiments, the laser may have a wavelength of between 700-900 nm, preferably 750-850 nm, more preferably about 800 nm. A laser source with these wavelengths is particularly suitable for systems not measuring third harmonic signals. At about 800 nm, light absorption by water is even lower than at 1050 nm, and both the illumination light and the second harmonic signal are in, or at least close to the visible spectrum, with a generally good availability of suitable optical components (including sensors).

In an embodiment, the laser source may have a pulse repetition rate in the range 10-100 MHz, preferably in the range 20-40 MHz. The pulse repetition rate should be sufficiently fast to allow fast scanning of the sample. Additionally, a higher frequency results in a shorter exposure time and hence fewer or smaller motion artifacts.

In an embodiment, the pulse picker can be configured to vary the number of pulses per burst. This way, the illumination of the sample can be adjusted to optimise the signal based on e.g. tissue type or scanning depth. Adjusting the number of pulses per burst equally affects, in a linear way, the intensity of several signal types, e.g. second-harmonics signals, third harmonic signals, and autofluorescence signals.

In an embodiment, the microscopy system can be configured to adjust the peak intensity per pulse. Adjusting the peak intensity per pulse also affects the energy per pulse. This way, the illumination of the sample can be adjusted to optimise the signal based on e.g. tissue type or scanning depth. Adjusting the peak intensity per pulse affects different signal types, e.g. second-harmonics signals, third harmonic signals, and autofluorescence signals, in a different way. Thus, by adjusting the peak intensity per pulse, one type of signal may be enhanced relative to a different type of signal.

In some embodiments, the peak intensity per pulse may be adjusted by the pulse picker. This reduces the need for an additional component, e.g. a filtering component, simplifying the system and reducing costs.

In an embodiment, the pulse picker comprises an acousto-optic modulator. This is an efficient and economical way to implement a pulse picker that can switch fast (typically, rise time of about 10 ns) and with sufficient efficiency (typically, >80% efficiency). An acousto-optic modulator may easily be controlled to select single pulses from the pulse train produced by the femtosecond oscillator, or can be used to select a number of consecutive pulses. Moreover, the acousto-optic modulator can also be used to lower the pulse energies between 0% and >80% of the original pulse energy. Thus, a single element can be used both to select a burst comprising any predetermined number of pulses from the pulse train, and to adjust the energy of the selected pulses.

In an embodiment, the pulse picker is configured to select one or more bursts of pulses from the pulse train, each of the one or more bursts comprising 2-20, preferably 3-10, more preferably 4-8 consecutive pulses. Bursts are separated from each other by at least one non-selected pulse from the pulse train. Typically, for a pulse train of sufficient length, the number of non-selected pulses is at least as high as the number of selected pulses. In a typical example, the laser source has a frequency of about 40 MHz or 80 MHz; thus, if the pixel rate is 1 MHz (corresponding to a dwell time of 1 μs), a burst comprising n consecutive pulses is followed by, respectively, 40-n or 80-n non-selected pulses.

In general, a smaller number of pulses per burst may improve the spatial resolution of the microscopy system. Since the fast axis of the scanner is typically implemented as a resonant scanner, or as a galvo mirror or MEMS mirror operated in a continuous oscillating mode, every light pulse excites a slightly different spot in the sample. As the signals caused by consecutive pulses in the burst can usually not be distinguished from each other (due to detector properties), this smearing effect can be minimized with short bursts. On the other hand, a larger number of pulses increases the illumination, and hence the signal strength, in a linear fashion.

Moreover, typical photodetectors, such as photomultipliers, may give a more reliable signal when a plurality of pulses is used. This is due to the fact that second harmonic signals and third harmonic signals have a duration that is of the same order of magnitude as the illumination pulses, typically less than 1 ns. As a result, the peaked space charge inside the photomultiplier may saturate the gain, reducing the dynamic range and/or leading to non-linear effects. This, in turn, reduces the possibilities for quantitative evaluation of the microscopy images.

In an embodiment, the at least one detector is configured to detect a second-harmonics signal, a third-harmonics signal, an autofluorescence signal, and/or a multi-photon signal. This way, high-contrast pathological images may be obtained without preparation of the sample, in particular without a need for staining the sample.

In an embodiment, the pulse picker is configured to repetitively select bursts of pulses. This allows repeated observations, possibly of different parts of the sample. In such an embodiment, the optics may comprise a raster scanner for scanning a target area of the sample. The raster scanner may define a two-dimensional raster of pixels in the target area, each pixel being illuminated by, preferably, a single burst of pulses. This way, a two-dimensional image of the sample may be acquired with a high spatial resolution and a low acquisition time. To this end, the microscopy system may comprise a controller configured to receive, for each pixel in the target area, a signal from the at least one detector.

In an embodiment, the pulse picker is configured to select pulse bursts with a frequency of at least 0.1 MHz, preferably at least 0.5 MHz, more preferably about 1-5 MHz. This frequency may be referred to as the burst frequency. The selection frequency of the pulse picker is preferably selected such that each pixel as defined by the raster scanner is illuminated with a single burst. Thus, the period of the pulse picker preferably corresponds to the dwell time per pixel of the scanner.

The detector may be configured to have a bandwidth that is substantially smaller than the pulse repetition rate and larger than the burst frequency (or scan rate). For example, if the pulse repetition rate is 80 MHz and the burst rate is 1 MHz, the detector bandwidth may be in the range 1.5-20 MHz. Preferably, the detector bandwidth is not much higher than the burst frequency, for instance, about a factor 1.5-4 higher, e.g. about double. This suppresses the noise.

In an embodiment, the raster scanner is a galvo-scanner system or a MEMS mirror scanner. These kinds of raster scanners are sufficiently fast to allow a high image acquisition rate. Additionally, they can be easy to control and to implement in the system.

In an embodiment, the microscopy system may further comprise a controller, preferably a field-programmable gate array (FPGA), for controlling the pulse picker, and, preferably, the raster scanner and/or the data acquisition from the detectors. By using a single controller to control a plurality of components, these components may be easily synchronized. In an embodiment, the controller is synchronized with the laser source. This way, all relevant components are inherently synchronized.

In a further aspect, the invention may relate to a method for femtosecond pulsed microscopy. The method may comprise selecting one or more bursts of pulses from a pulse train comprising femtosecond laser pulses. Each of the one or more bursts comprises a plurality of consecutive pulses. The one or more bursts may comprise less than 25%, e.g., less than 15%, of the pulses of the pulse train. The method further comprises illuminating a sample with the one or more bursts of pulses, and detecting a signal caused by interaction of the burst of pulses with the sample. The signal corresponds to one of the one or more bursts.

In an embodiment, the selection comprises repetitively selecting a burst of pulses. In such an embodiment, the method may further comprise moving a focal spot to a different position on the sample. Preferably, the positions on the sample define a raster of sample pixels in a target area of the sample, each sample pixel being illuminated by one burst of pulses.

In an embodiment, the method may further comprise determining an image comprising image pixels, each image pixel corresponding to a sample pixel, and each image pixel having a pixel value based on the detected signal caused by interaction of the burst of pulses with the corresponding sample pixel.

One or more of these method steps may be executed by a microscopy system as described above. Consequently, the aforementioned microscopy system may be configured to execute one or more of these method steps.

One aspect of this disclosure relates to a control module, e.g., a field-programmable gate array (FPGA), for a microscopy system as described above. The control module may be configured to execute, or cause the microscopy system to execute, one or more of the method steps described above. In some embodiment, the control module may comprise a computer readable storage medium having computer readable program code embodied therewith, and a processor, preferably a microprocessor, coupled to the computer readable storage medium, wherein responsive to executing the computer readable program code, the processor is configured to perform any of the methods described herein.

One aspect of this disclosure relates to a computer program or suite of computer programs comprising at least one software code portion or a computer program product storing at least one software code portion, the software code portion, when run on a computer system. e.g., a control module as described above, being configured for executing any of the methods described herein.

One aspect of this disclosure relates to a non-transitory computer-readable storage medium storing at least one software code portion, the software code portion, when executed or processed by a computer, is configured to perform any of the methods described herein.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Moreover, a computer program for carrying out the methods described herein, as well as a non-transitory computer readable storage-medium storing the computer program are provided. A computer program may, for example, be downloaded (updated) to the existing data processing systems or be stored upon manufacturing of these systems.

Elements and aspects discussed for or in relation with a particular embodiment may be suitably combined with elements and aspects of other embodiments, unless explicitly stated otherwise. Embodiments of the present invention will be further illustrated with reference to the attached drawings, which schematically will show embodiments according to the invention. It will be understood that the present invention is not in any way restricted to these specific embodiments.

BRIEF DESCRIPTION OF THE DRAWINGS

Aspects of the invention will be explained in greater detail by reference to exemplary embodiments shown in the drawings, in which.

DETAILED DESCRIPTION

The embodiments in this disclosure describe methods for obtaining fast images of unprepared samples. e.g., fresh biopsies or living tissue, using non-linear optics for contrast. Non-linear optics may include, for example, second harmonics, third harmonics, autofluorescence, and multi-photon interactions. Thus, the embodiments enable obtaining high-resolution (pathological) images during surgery and/or endoscopy, allowing surgical and/or endoscopic procedures to be adjusted based on pathological information. Although the examples given herein are mainly geared to pathological applications, other applications such as, e.g., industrial quality control are not excluded.

Figure 1:
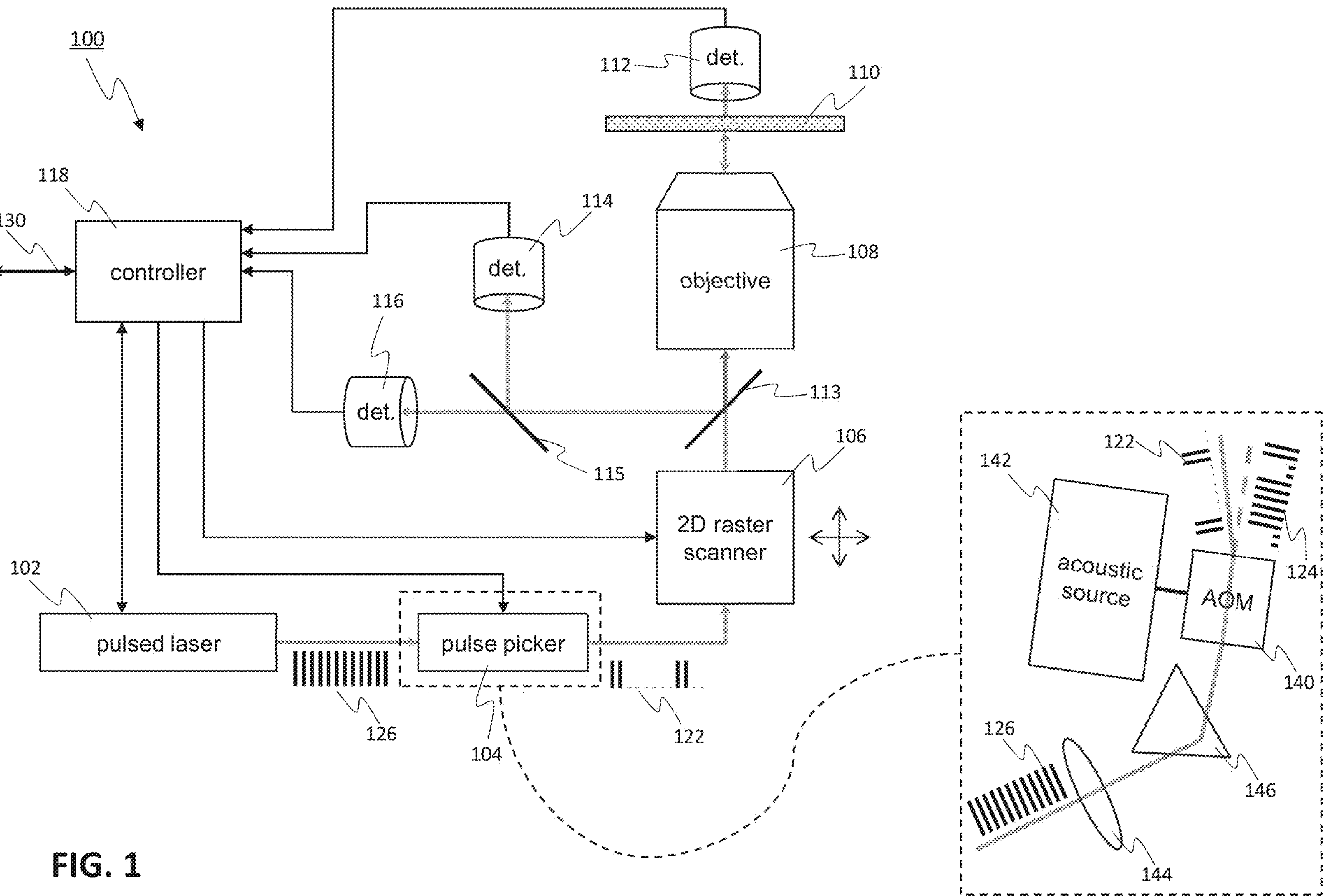
FIG. 1 schematically depicts a microscopy system according to an embodiment.

FIG. 1 schematically depicts a microscopy system according to an embodiment. The microscopy system 100 comprises a light source 102 comprising a femtosecond laser, e.g., a mode-locked Ti:sapphire laser or an Yb fiber laser. Currently, suitable laser sources typically generate a pulse train 126 with a repetition rate of between 10-100 MHz, for example about 80 MHz. As will be explained below, a higher repetition rate may lead to more fine-grained selection of the sample illumination intensity.

Selection of a suitable laser source may comprise several trade-offs. In general, a higher peak intensity of each pulse leads to stronger non-linear optics signals. For example, second harmonics scale with the square of the peak intensity and third harmonics scale with the cube of the peak intensity. However, a peak intensity that is too high may lead to so-called non-linear damage in the sample 110. On the other hand, when peak intensity is too low, longer illumination times may be required to obtain sufficient image quality, which may be obtained by using longer pulses (and thus a higher energy per pulse) and/or a larger number of pulses per pixel. This may, in turn, lead to thermal damage due to overheating of the tissue. The energies for which tissue damage occurs may depend, inter alia, on tissue type, pulse intensity, pulse duration, wavelength, numerical aperture, and focus size. Typically, the energy per pulse should be at least 0.1 nJ, preferably in a range of about 1-5 nJ (measured at the sample). The pulse duration may be less than 250 fs, preferably less than 100 fs. Other applications may, however, use different parameters. In particular, in applications in which thermal damage is not an issue, a much wider parameter range may be considered to optimise image quality. In a typical example imaging a biological sample, a system with a numerical aperture of 1 and a laser source with a wavelength of 1050 nm may be used with a pulse duration of less than 100 fs and an energy of about 1 nJ per pulse.

Similarly, the wavelength of the laser source may be selected based on the envisioned use of the microscopy system. Biological samples (including pathology samples) typically have a high water content. Therefore, in order to increase the maximal penetration depth and reduce energy absorption by the sample, it may be beneficial to choose an illumination wavelength with a low water absorption, for example about 800 nm or between 1000-1200 nm, preferably about 1050 nm. The absorption spectrum of water has a minimum around 800 nm, and a local minimum around 1050 nm.

The second-harmonics signal has a wavelength that is half the wavelength of the illumination wavelength, and the third-harmonics signal has a wavelength that is one third of the illumination wavelength. Thus, for an illumination wavelength of 800 nm, the second harmonic signal has a wavelength of 400 nm and the third harmonic signal has a wavelength of 267 nm. The latter is in the (mid-)ultraviolet part of the electromagnetic spectrum, and may have a high absorption by the sample, leading to a weak signal. Additionally, standard optical components may be less suitable for ultraviolet light, and suitable components may be more expensive than components optimized for visible light.

Therefore, in microscopy systems that are not configured to measure third harmonic signals, a laser source with a wavelength of about 800 nm may be used. In microscopy systems that are configured to measure third-harmonics signals, the laser source may generate light with a wavelength of approximately 1050 nm. In that case, the second harmonics have a wavelength of 525 nm and the third harmonics have a wavelength of 350 nm. These wavelengths have a relatively low absorption by typical biological samples. Moreover, optical components may be used that are transparent in the range 350-1050 nm, which tend to be more easily available and/or more economical than optical components for use in the (deeper) infrared or ultraviolet ranges.

A pulse picker 104 downstream of the laser source selects bursts 122 comprising one or more consecutive laser pulses from the pulse train 126. In general, the optimal number of pulses per burst depends on, inter alia, the sample, the imaging depth, the repetition rate, and the energy per pulse. A burst may comprise 1-20, preferably 2-10, more preferably 4-8 consecutive pulses. Bursts are separated from each other by at least one non-selected pulse from the pulse train.

Typically, for a pulse train of sufficient length, the number of non-selected pulses is at least as high as the number of selected pulses. Preferably, the bursts are relatively short, i.e., the proportion of selected pulses is relatively low compared to the total number of pulses, e.g., lower than 30%, preferably lower than 20%, more preferably lower than 15% of the total number of pulses.

The pulse picker can comprise an acousto-optic modulator (AOM) 140. The acousto-optic modulator may be driven by an acoustic source 142, e.g., a piezo element. A lens 144 may focus the laser pulses in the acousto-optic modulator. Typically, the first-order diffracted signal is used to select pulses 122 from the pulse train 126, while the zeroth-order non-diffracted signal comprises the non-selected pulses 124.

The acousto-optic modulator can comprise, e.g., a $TeO_2$ crystal, fused silica, or a quartz crystal. Other suitable acousto-optic modulators are known in the art. The acousto-optic modulator can have an acoustic frequency of 20-400 MHz, for example about 250 MHz.

An acousto-optic modulator is an efficient and economical way to implement a pulse picker that can switch fast (typically, rise time of about 10 ns) and with high efficiency (typically, >80% efficiency for the selected pulses and effectively 0% for the non-selected pulses). By switching on and off the acoustic source, the acousto-optic modulator may easily be controlled to select a number of consecutive pulses or even single pulses from the pulse train produced by the femtosecond oscillator. Although a Pockels cell can, in theory, be used to quickly and precisely switch between transmitting and blocking the laser bundle, the high drive voltages that are required to operate a Pockels cell make this a less suitable option for switching with a MHz frequency. Optical MEMS switches, e.g., based on mirrors, are currently too slow to allow switching with a MHz frequency. However, they could be used in slower systems. When faster switches are available, they may also be used.

Because femtosecond pulses necessarily have a significant spectral width, and since an acousto-optic modulator is essentially a diffraction grating (with the wavelength of the acoustic wave as the grating period), the diffracted light beam, which is used as the 'selected' beam, may become distorted. This distortion is due to the difference in diffraction angle for the different wavelengths in the femtosecond pulse, leading to dispersion of the laser bundle. The distortion may affect the shape and the focusing properties of the laser beam.

The dispersion may be compensated, at least in part, using a dispersion prism 146. If a $TeO_2$ acousto-optic modulator with an acoustic frequency of 250 MHz is used, an equilateral dispersion prism made of SF11 glass may be used for dispersion compensation. The dispersion prism may be positioned upstream or downstream of the acousto-optic modulator. However, it has been found that if the dispersion prism is positioned upstream of the acousto-optic modulator, the efficiency of the acousto-optic modulator may be increased. Acousto-optic modulators based on fused silica or quartz lead to less dispersion in the laser beam than acousto-optic modulators based on $TeO_2$, reducing or even eliminating the need for dispersion correction. On the other hand, $TeO_2$-based acousto-optic modulators have a larger diffraction angle of the selected pulses, making it easier to separate the selected pulses and the non-selected pulses.

The system may further comprise an energy filter for adjusting, preferably dynamically adjusting, the peak intensity per pulse, and thus, the energy per pulse. This way, the peak intensity or energy may be optimized based on, e.g., the sample type and imaging depth. The pulse picker and the energy filter can be the same component (or group of components), for example a pulse picker based on an acousto-optic modulator as described above.

Thus, the acousto-optic modulator may, at the same time, act as a dynamically adjustable pulse picker and as a dynamically adjustable filter. This allows to vary both the number of pulses per burst and the peak intensity or energy per pulse in a relatively simple, easy to operate way. Conventional femtosecond laser microscopy systems may comprise means to switch off illumination of the sample during the backsweep, e.g., using a Pockels cell. However, as was mentioned above, a Pockels cell cannot be switched with a sufficiently high rate to function as a pulse picker. Compared to, e.g., a Pockels cell, an acousto-optic modulator can be switched on and off at a much higher rate.

Nevertheless, other embodiments may use separate devices for pulse-picking and energy adjustment.

The depicted system further comprises a two-dimensional raster scanner 106, typically downstream of the pulse picker. The raster scanner may comprise a galvoscanner comprising a pair of galvomirrors. Other embodiments may use different raster scanners, e.g., based on a MEMS mirror or based on a resonant mirror.

The system further comprises an objective 108 for focusing the pulses on the sample 110. The objective preferably has a high numerical aperture, e.g., larger than or equal to 1, to allow a small focal spot. A higher numerical aperture leads to a smaller focal spot size, and hence higher spatial resolution, and increases the peak light intensity, and thus signal intensity.

The system further comprises one or more detectors 112, 114, 116 for detecting light reflected by and/or passed through the sample. The light may be split using e.g. a partially reflective mirror 113 and/or a dichroic mirror 115. For example, the system may comprise a detector 112 for detecting transmitted signals on the opposite side of the sample than the objective.

The system may comprise a detector 114 for detecting second harmonics. Second harmonic light has a wavelength that is half the wavelength of the incident light. Therefore, if a laser source with a wavelength of 1050 nm is used, the second harmonic light has a wavelength of 525 nm. The second harmonic light can be selected using a dichroic mirror 115. The second harmonic light can also be selected using a colour filter, or other means known in the art.

The system may comprise a detector 116 for detecting third harmonics. Third harmonic light has a wavelength that is one third the wavelength of the incident light. Therefore, if a laser source with a wavelength of 1050 nm is used, the third harmonic light has a wavelength of 350 nm. The third harmonic light can be selected using a dichroic mirror. The third harmonic light can also be selected using a colour filter, or other means known in the art.

The system may comprise one or more further detectors (not shown) for detecting other signals, e.g., a detector for detecting autofluorescence light.

One or more of the detectors may comprise a photomultiplier tube. In other embodiments, other types of detectors may be used, e.g., based on charge-coupled devices (CCDs). Photomultiplier tubes typically have a very high sensitivity, being able to measure single photons. Thus, they are suitable for detecting the often weak non-linear signals such as second and third harmonics signals also at relatively low, and hence non-damaging, peak light intensities.

However, if pulse bursts with single pulses are used, so that each pixel is illuminated only by a single pulse ('single-shot approach'), the signal-to-noise ratio may be limited by the intrinsic properties of the photomultiplier tube, as will be explained below.

The (dark) noise of the detector is typically negligible, typically much less than 1 photo-electron per pixel at a 1 MHz pixel rate, but the magnitude of the signal that can be detected can be limited. The signal-to-noise ratio scales with the square root of the number of detected photons. For example, in order to obtain a signal-to-noise ratio of 100 it is necessary to detect at least 10,000 photons per pixel.

However, the response from a single femtosecond pulse for second and third harmonics detection is very short, typically in the nanosecond range or shorter, even after multiple scattering in the sample (this is to a lesser extent true for the multi-photon fluorescence signals which are broadened by the lifetime of the involved excited states). This leads to space-charge effects in the photomultiplier tube, and linear amplification in the dynode chain is then not always possible.

Consequently, when such a detector detects a response from a single light pulse, the detected signal is found to have a relatively high non-linearity, whereas the detector response to a burst comprising a plurality of pulses has a relatively much higher linearity. As a linear response is typically preferred for many applications, such as quantitative analysis of microscopy images, and in particular for AI-based analysis, a burst comprising a plurality of pulses may be preferred.

By using a low number greater than one of pulses per pixel, e.g., 5-10 pulses, the arrival time of the signal may be spread, avoiding space charge effects and increasing linearity of the signal.

The system further comprises a controller 118, e.g., a field-programmable gate array (FPGA). Preferably, a single controller controls the pulse-picker, the raster scanner, and the data-acquisition system. This way, real-time control and optimal synchronization may be achieved. By having relatively short bursts with good synchronization to the raster scanner, the analogue bandwidth of the detectors does not lead to a reduction in resolution; the measurement may be considered to be 'stroboscopic'.

The controller may be connectable to a host computer via a data connection 130. System parameters, such as scan parameters, e.g., number of pulses per burst and energy per pulse, can be loaded from the host computer to the controller, and acquired data can streamed from the controller to the host computer.

FIG. 2A-D schematically depict selecting a burst comprising one or more consecutive pulses. If an acousto-optic modulator is used as the pulse picker, the number of pulses in a burst and the amplitude (energy) of the pulses can be adjusted by adjusting a control signal provided to the acousto-optic modulator. In practice, the amplitude of the selected pulses can be varied between 0% and about 80% of the input.

In these examples, the laser source generates a pulse train 200 with a frequency of 80 MHz (and hence a period of 12.5 ns between two pulses). The width of the femtosecond pulses has been exaggerated for improved visibility.

Figures 2A, 2B, 2C, 2D:
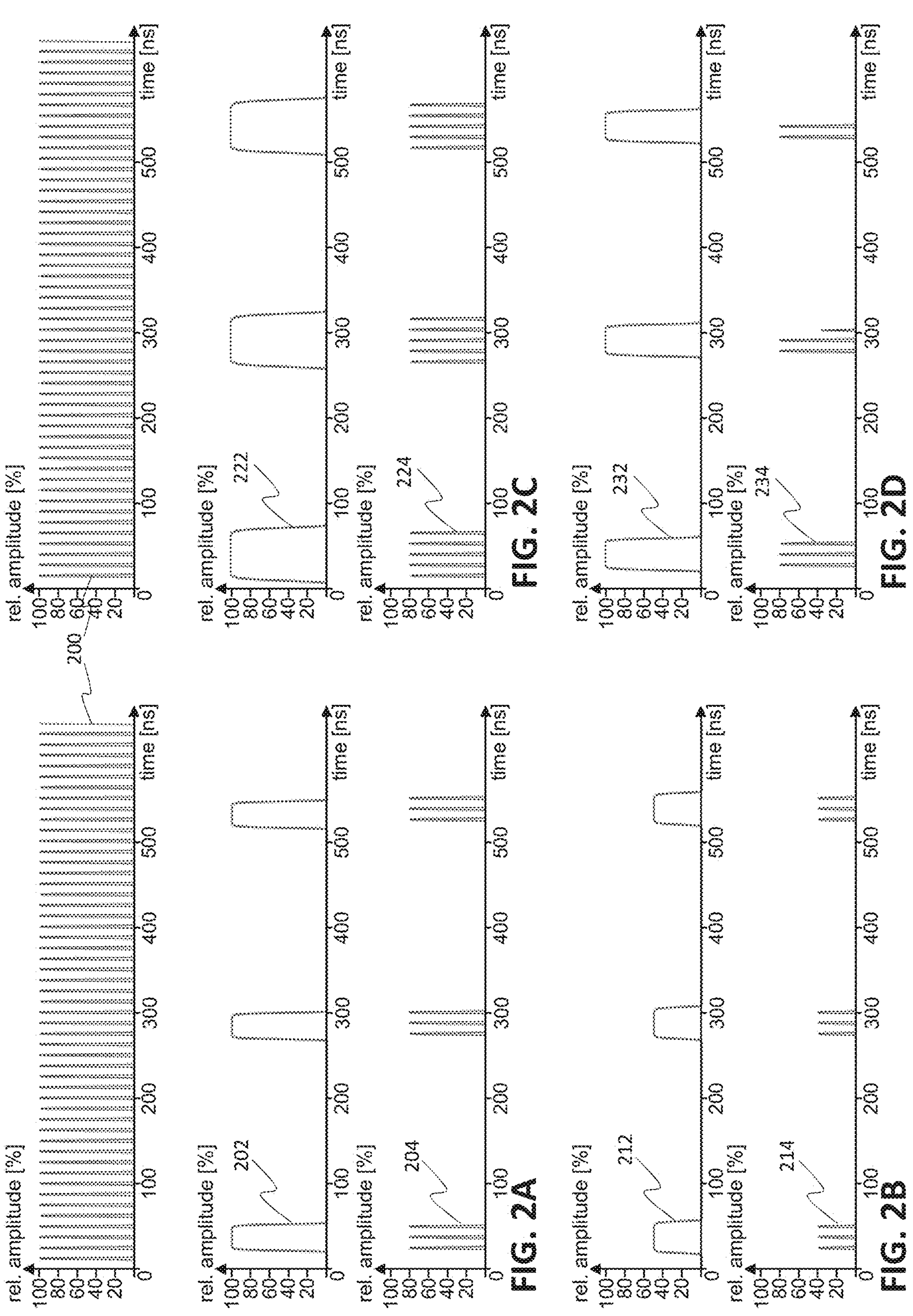
FIG. 2A-D schematically depict selecting a burst comprising one or more consecutive pulses.

FIG. 2A depicts a control signal 202 for the pulse picker that is synchronized with the laser source. The control signal has a frequency of 4 MHz, a pulse width of about 37.5 ns, and a maximum amplitude. This results in bursts 204 comprising 3 consecutive pulses being selected from every 20 pulses from the pulse train. Thus, the relative burst length is 3/20=15%. These pulses in the burst of selected pulses have an amplitude of about 80% of the input pulses.

FIG. 2B depicts a control signal 212 for the pulse picker that is synchronized with the laser source. The control signal has a frequency of 4 MHz, a pulse width of about 37.5 ns, and an amplitude of half the maximum amplitude. This results in bursts 214 comprising 3 consecutive pulses being selected from every 20 pulses from the pulse train. These pulses in the burst of selected pulses have an amplitude of about 40% of the input pulses. This means that, compared to the previous example, the detection of the second harmonics is reduced by about a factor 4 and the detection of third harmonics by about a factor 8.

FIG. 2C depicts a control signal 222 for the pulse picker that is synchronized with the laser source. The control signal has a frequency of 4 MHz, a pulse width of about 62.5 ns, and a maximum amplitude. This results in bursts 224 comprising 5 consecutive pulses being selected from every 20 pulses from the pulse train (relative burst length 25%). These pulses in the burst of selected pulses have an amplitude of about 80% of the input pulses. Compared to the situation depicted in FIG. 2A, this results in a roughly 40% increase in illumination and signal for all detectors. However, as the illumination is more spread out spatially, the spatial resolution is potentially lower.

FIG. 2D depicts a control signal 232 for the pulse picker that is not synchronized with the laser source. The control signal has a frequency of 3.95 MHz, a pulse width of about 37.5 ns, and a maximum amplitude. This results in bursts 234 comprising 2-3 consecutive pulses being selected from every 20.25 pulses from the pulse train. In the depicted example, the first burst comprises 3 pulses with an amplitude of about 80% of the input pulses. The second burst comprises 2 pulses with an amplitude of about 80% of the input pulses, and one pulse that passed the pulse picker during the falling edge of the control signal with an amplitude of about 40% of the input pulses. The third burst comprises only 2 pulses with an amplitude of about 80% of the input pulses.

This may affect the image quality, leading to the formation of stripes. The effect may be different for different signal types. In general, the effect is less pronounced if each burst comprises a larger number of pulses, and may become nearly invisible for a burst with, e.g., 5 or more or 8 or more pulses.

Figure 3:
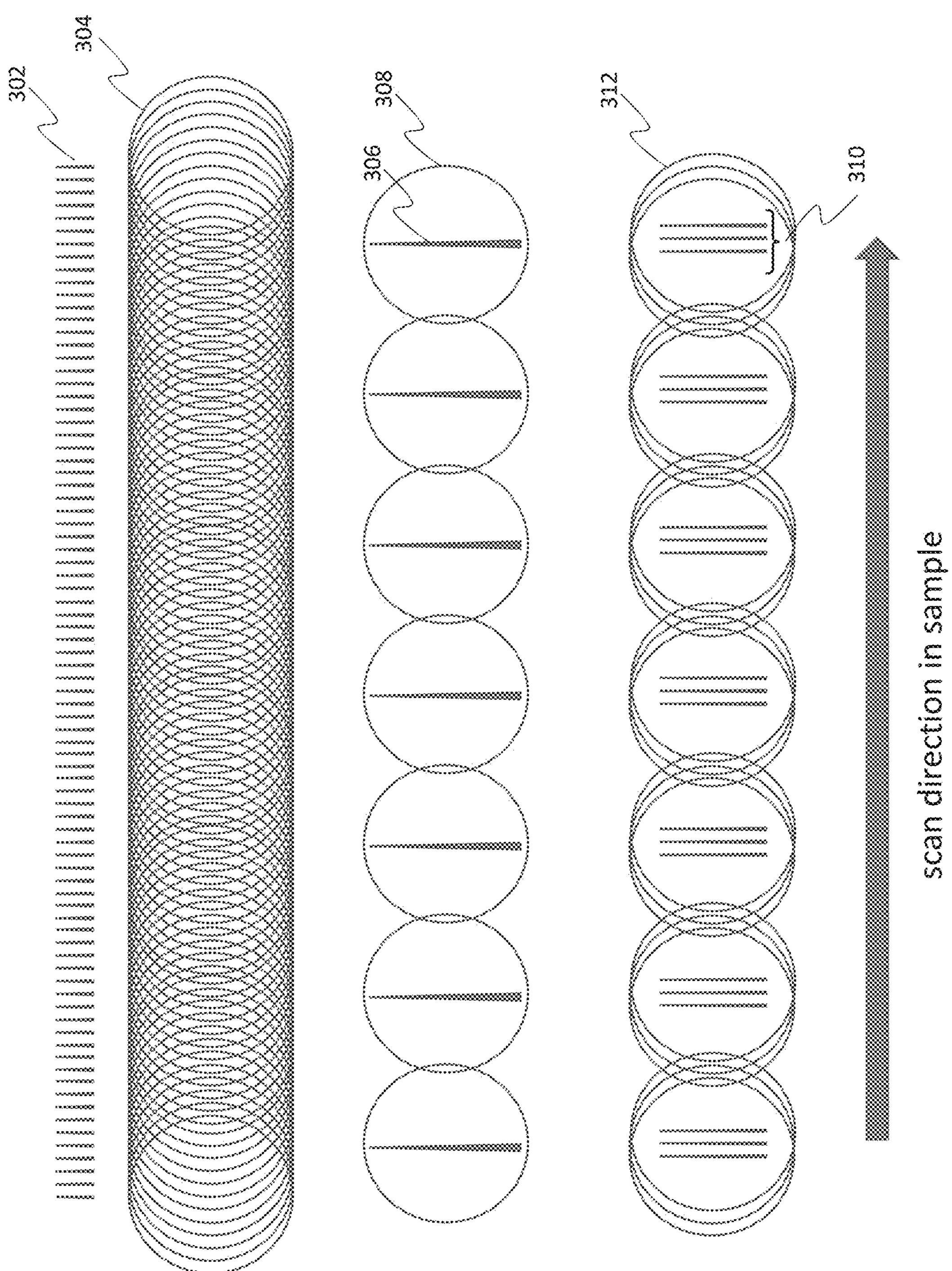
FIG. 3 depicts the effect of the pulse picker on the illumination of a sample.

FIG. 3 depicts the effect of the pulse picker on the illumination of a sample. In general, each selected pulse leads to an illuminated spot on the sample, the size of which is limited by the diffraction limit, and hence wavelength dependent. For 1050 nm laser pulses, the size of the focus is about 0.5 micrometer (given by the diffraction limit, the effective spot size is smaller due to non-linear effects). With a raster scanner working at 1 kHz line frequency and a field of view of 0.5 mm (typically limited by the focusing optics) and an 80 MHz laser (most common type), subsequent spots are shifted by about 12.5 nm. This is only a small fraction of the ~500 nanometer spot size, and hence spots associated with subsequent pulses overlap. In the figure, the distance between the spots is only schematic (and vastly exaggerated) to preserve visibility of the individual spots.

In a first example, the pulse picker selects all pulses from the pulse train 302. The pulse picker may still work as a variable attenuator. In this case, as was explained above, there is substantial overlap between the spots 304 illuminated by subsequent pulses. For the given example, each part of the sample may be illuminated with 40 subsequent pulses, potentially leading to substantial heating of the sample and hence sample damage. Moreover, it is usually non-trivial to temporally separate the signals from the individual pulses, reducing the spatial resolution.

In a second example, the pulse-picker selects only a single pulse 306 per pixel. In theory, this may lead to the highest spatial resolution and lowest sample heating. In this case, spots 308 associated with subsequent pulses do not overlap, or only for a negligible amount. However, this mode may have two practical drawbacks. First of all, if the peak pulse intensity is high enough to obtain a good signal, there is a high risk of non-linear damage in the sample. For biological samples, non-linear damage typically starts to occur at around 5 nJ per pulse (measured at the sample; actual value depending on wavelength and pulse-length). Secondly, as was explained above, the detectors may display a (strongly) non-linear response to single very short pulses.

The third example displays bursts 310 with a relatively low number larger than one of consecutive pulses, in this case three pulses per burst. Each pixel is illuminated by 3 spots 312, so that the energy deposition is only 3/40=7.5% of that of the first example. At the same time, the peak power can be smaller than in example 2, reducing or preventing non-linear sample damage. Additionally, the pulses within a burst are temporally separated in a way that is sufficient to avoid the space-charge effects in the detector, and the bursts are sufficiently temporally separated to easily associate each signal with a pixel.

Figure 4:
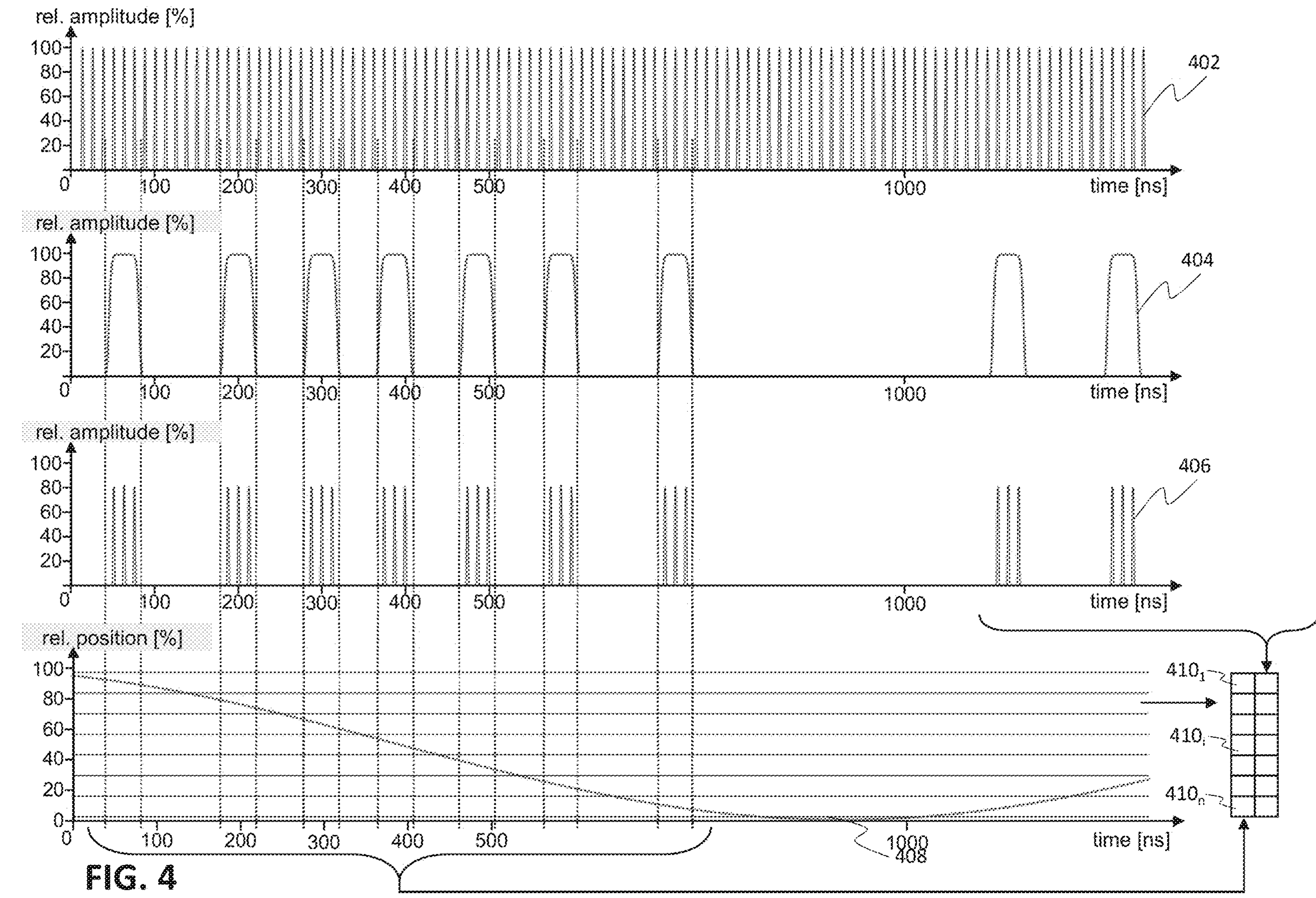
FIG. 4 depicts a control signal for the pulse picker that is synchronized both with the laser source and with the raster scanner.

FIG. 4 depicts a control signal for the pulse picker that is synchronized both with the laser source and with the raster scanner. In the depicted example, the raster scanner comprises a slow mirror and a fast mirror. The fast mirror follows a sine pattern 408. Consequently, the mirror moves relatively fast over pixels $\mathbf{410}_i$ near the center of the field of view, and relatively slow over pixels $\mathbf{410}_1$, $\mathbf{410}_n$ near the edges of the field of view. Consequently, if constant illumination is used, the pixels near the edge are overexposed compared to pixels near the center.

In some microscopy systems, this may be compensated for by adjusting the detector signal, but that does not prevent overheating of the sample. Additionally or alternatively, some systems mitigate this effect by effectively using only a central part of the mirror motion and switching of the light source close to the turning points. In some systems, only about one third of the mirror range is used. This limits the field of view and increases acquisition times.

This can be solved by controlling the pulse picker with a control signal 404 based on a speed of the raster scanner. In particular, the pulse picker rate can be roughly proportional to the speed of the raster scanner, in particular to the speed of the fast mirror of the raster scanner.

As shown in the figure, a constant number of pulses close to the center of each pixel is selected. As in FIG. 2, the laser source generates a pulse train 402 with a repetition rate of 80 MHz. Because the pulse picker is synchronized to the laser source, each burst 406 comprises an equal number of pulses, and hence, the illumination of each pixel is the same. In this example, the mirror oscillates with a frequency of 0.47 MHz, leading to a line frequency of 0.96 MHz. In this example, the mirror is not synchronized with the laser source and as a result, the bursts may not coincide exactly with the center of the pixel.

In some embodiments, a resonant mirror may be used as the fast mirror. In such cases, it may be impossible to synchronise the laser source and the fast mirror. A resonant mirror can be faster than a non-resonant mirror, reducing acquisition times. However, if the mirror moves too fast, this may lead to motion artifacts or a lower signal-to-noise ratio in the obtained image. In some embodiments, this can be at least partially corrected for using known software.

In other embodiments, e.g., the embodiment depicted in FIG. 1, the fast mirror may be driven by a control signal. In that case, the mirror movement may be synchronized to the laser source.

In some embodiments, a more linear control signal may be used to drive the mirror, e.g., a triangular signal. In such embodiments, the mirror speed may be essentially constant over a large range of the mirror motion. In these embodiments, there may be less or no need to use a variable pulse picker rate based on the fast mirror speed. The pulse picker may be used to effectively switch off illumination in the non-linear part of the mirror movement.

Synchronization of the raster scanner and the detector is discussed in more detail below with reference to FIG. 5.

For pictorial clarity, the depicted example comprises only 7 pixels in each line, but more realistic examples may comprise a few hundred or more pixels per line.

Figure 5:
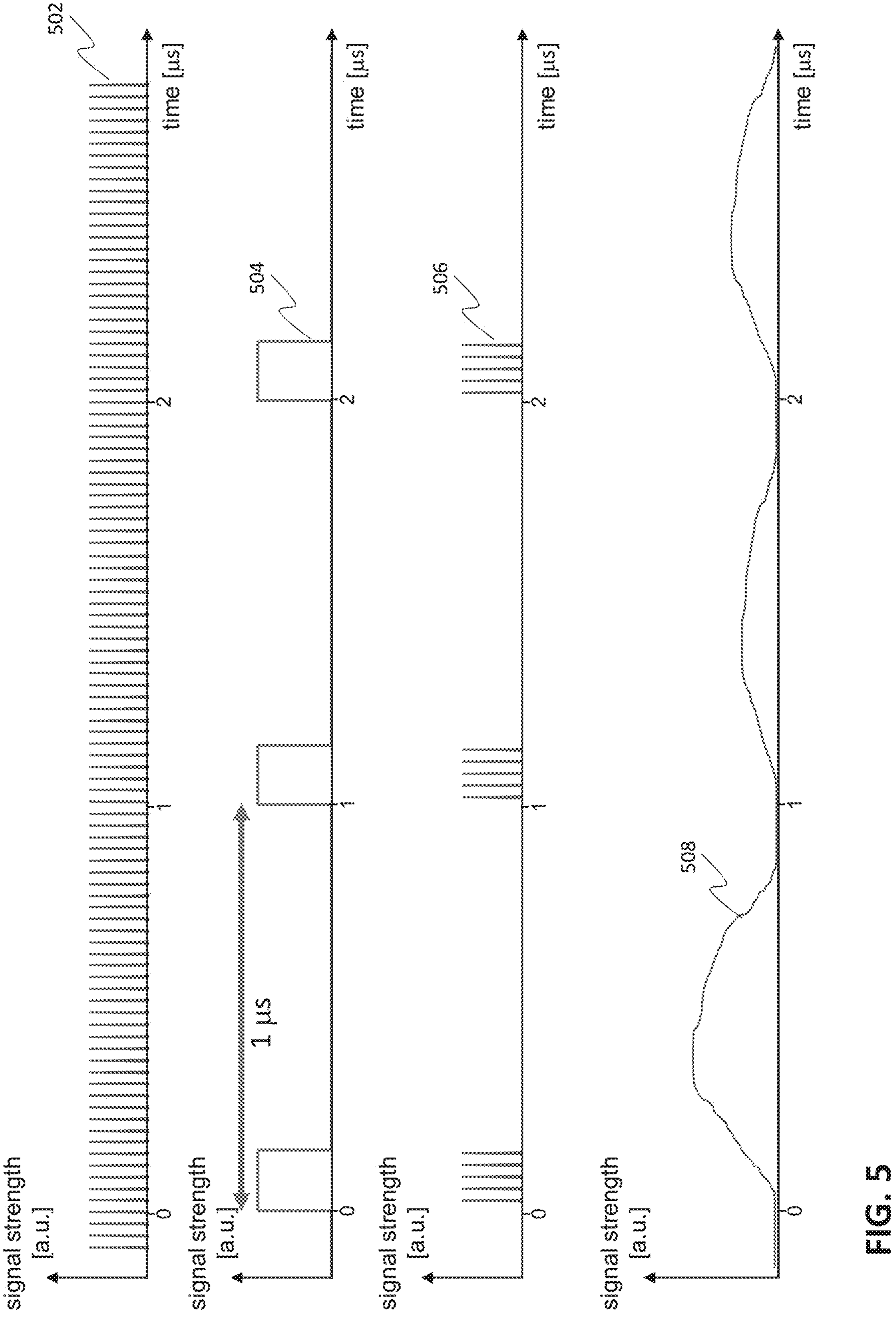
FIG. 5 depicts the effect of the pulse picker on a signal generated by a detector.

FIG. 5 depicts the effect of the pulse picker on a signal generated by a detector. In the depicted embodiment, a pixel-rate of 1 MHz is chosen. A control signal 504 is provided to the pulse picker to select bursts 506 of 5 pulses from a 35 MHz pulse train 502. This leads to a detector signal 508.

Here, the detector signal represents a schematic impression of a signal from the photo-multiplier tubes after amplification by a trans-impedance amplifier with a bandwidth of about 2 MHz. These amplifiers result in a low noise, but the bandwidth is insufficient to separate the signals from the five individual pulses per bunch. An amplifier with a higher bandwidth could register the signals corresponding to each of the five pulses separately, but this comes at a cost of higher noise.

As was discussed above with reference to FIG. 3, if the burst is relatively short, the corresponding light pulses impinge approximately on the same spot of the sample, and therefore it is not necessary to distinguish between the individual pulses. However, proper synchronization between the data acquisition system and the raster scanner is required to assign each detection to the correct pixel. If the raster scanner has a substantially non-uniform speed, the data-acquisition rate may be adjusted accordingly. Alternatively, the data-acquisition rate may be substantially higher than the pixel rate, leading to oversampling. The data points closest to each pixel center may then be selected.

By measuring the burst as a single unity, a relatively slow transimpedance amplifier can be used, e.g., one with a bandwidth of 2 MHz and a high gain (300 KV/A). This simplifies the detection electronics, reducing noise, and reducing costs.

Figure 6:
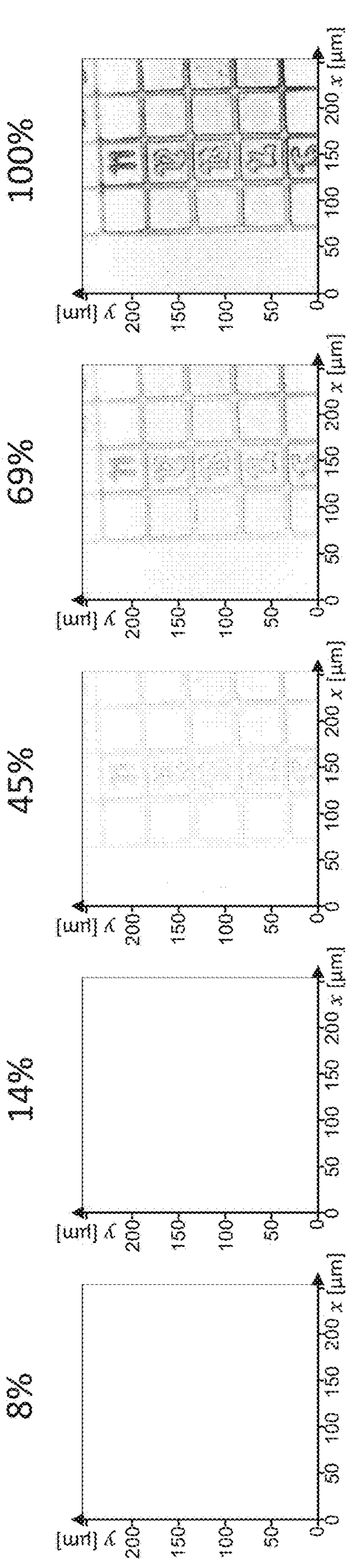
FIG. 6 depicts the relation between pulse energy and image quality.
Figure 6:
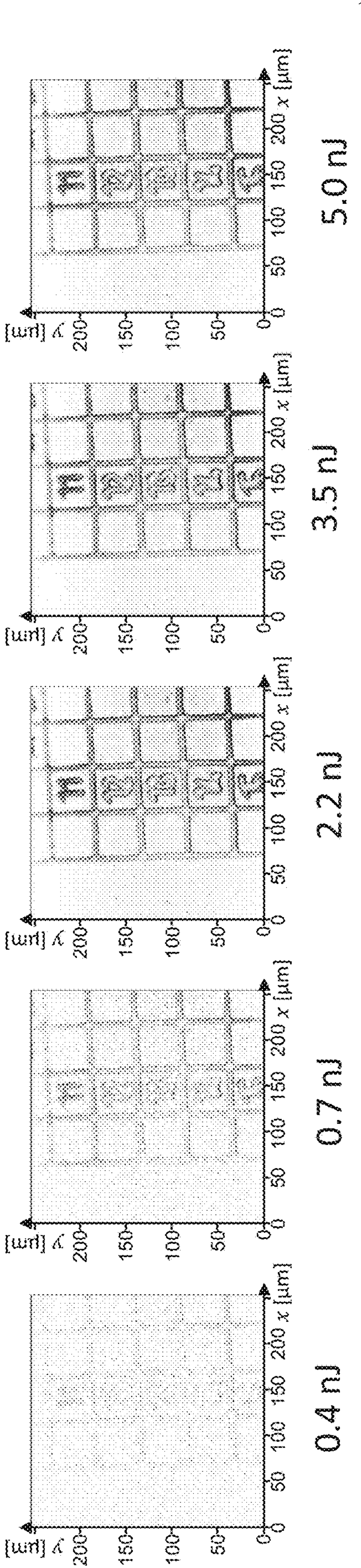

FIG. 6 depicts the relation between pulse energy and signal strength for third harmonic signals. All images are obtained with the same microscopy system, which is similar to the system depicted in FIG. 1. The images were obtained with an Yb fiber laser with 13 MHz pulse repetition rate. An acousto-optic modulator was used as a pulse picker. The pulse picker, raster scanner, and detector were controlled by a single FPGA, and hence mutually synchronized. All 5 images were recorded with a burst-mode of 3 pulses per pixel. The energy of the pulses in the burst of selected pulses could be varied between 0-80% of the input energy. The percentages in the figure represent the percentage of the maximum output energy that can be delivered by the pulse picker.

The image shows a calibration grid (Ibidi) with a 50 micrometer grid. The measured and depicted signal is the third-harmonics signal at the surface of the grid. By varying the pulse power from about 0.4 nJ, 0.7 nJ, 2.2 nJ, 3.5 nJ to 5 nJ per pulse delivered to the sample going from left to right, the cubic power dependence of the third-harmonics signal is demonstrated. In the top row all signals are scaled the same way, where the scaling is based on the 100% image. The bottom row shows the same data as the top row, but with contrast scaling to enhance the images.

Clearly, even the images recorded with 8% of the power, where the signals are a factor 2,000 ($(1/0.08)^3$) lower than at 100% are well above the noise, which demonstrates that the scan has a dynamic range of about 4,000. This corresponds to 12 bits per channel, or up to 36 bits of data when using 3 channels. This poses a luxury problem: it is more information than can be represented on a 24 bits RGB display.

It is important to note that when adjusting the power on the sample by varying the number of pulses per burst, this has the same effect on all channels. All channels, be it third-harmonic, second harmonic, or even linear signals, scale linearly with the number of pulses per burst.

When adjusting the light intensity by varying the pulse energy, the third-harmonics signal will scale with the cube of the pulse-power, and the second-harmonics signal with the square of the peak power this changes the appearance of the image. Therefore, burst-width variation is typically the best way to adjust the power on the sample.

Figure 7:
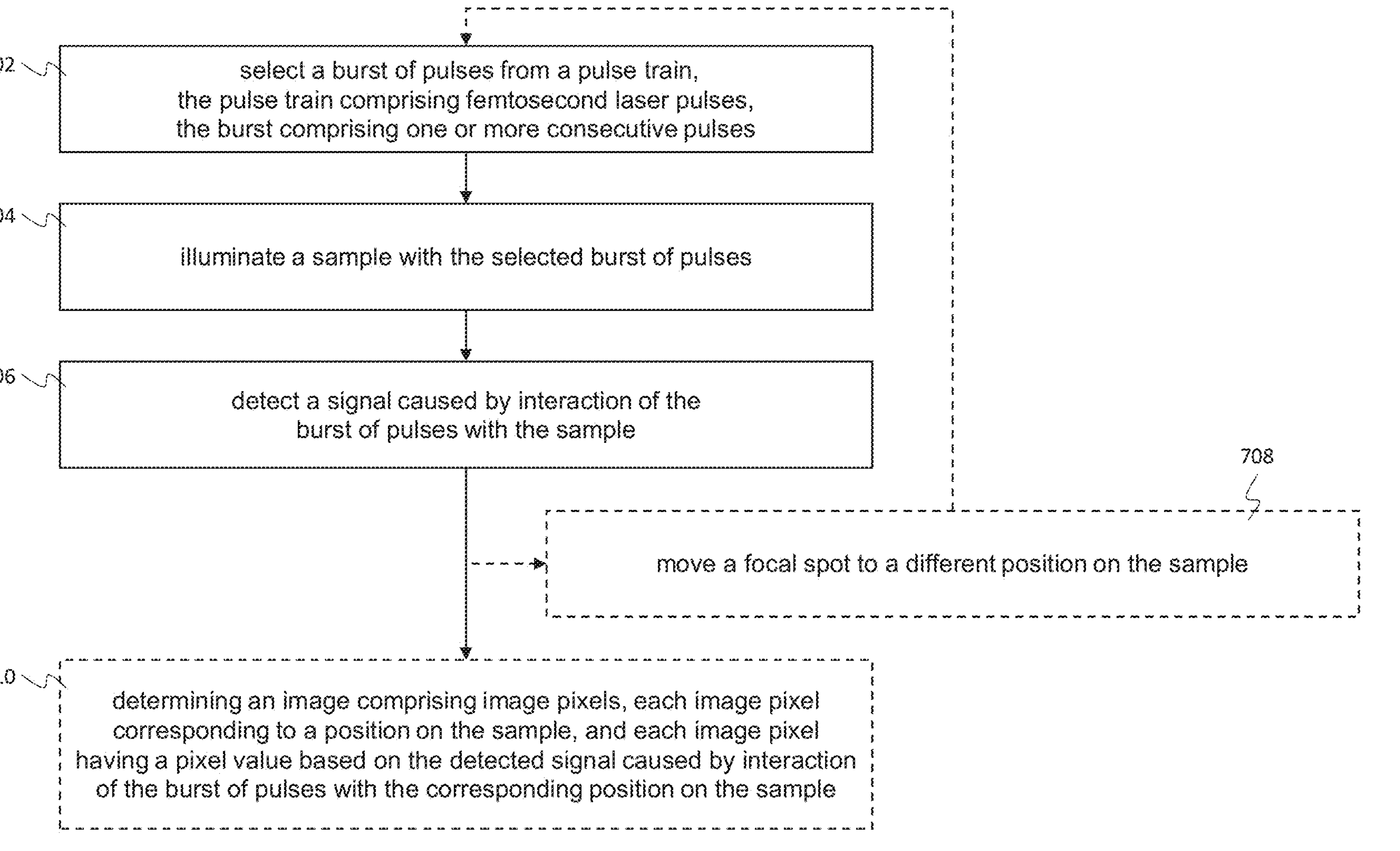
FIG. 7 depicts a method for femtosecond-pulsed microscopy according to an embodiment; and, FIG. 8 is a block diagram illustrating an exemplary data processing system that may be used for executing methods and software products described in this application.

FIG. 7 depicts a method for femtosecond-pulsed microscopy according to an embodiment. One or more of these method steps may be executed by a microscopy system as described above with reference to FIG. 1. In a first step 702, the method comprises selecting a burst of pulses from a pulse train comprising femtosecond laser pulses. The burst may comprise one or more consecutive pulses. A burst may be demarcated on either side by one or more non-selected pulses.

In a step 704, a sample, e.g., a biological sample such as living tissue or a fresh biopsy, is illuminated with the selected burst of pulses. This is typically done using an optical system focusing the selected burst of pulses on a certain position on the sample. Preferably, a high-numerical-aperture objective is used. e.g., NA≥1. In a step 706, a signal caused by interaction of the burst of pulses with the sample is detected.

In a typical embodiment, steps 702-706 are repeated a number of times. In between two repetitions, in a step 708, a focal spot may be moved to a different position on the sample. Preferably, the positions on the sample define a raster of sample pixels in a target area of the sample. This may be achieved by using a raster scanner as described above. Each sample pixel may be illuminated by at least one, preferably exactly one burst of pulses. This can be achieved by synchronizing control of a pulse picker performing step 702 and a raster scanner performing step 708.

In an optional step 710, the method may further comprise determining an image comprising image pixels, each image pixel corresponding to a sample pixel, and each image pixel having a pixel value based on the detected signal caused by interaction of the burst of pulses with the corresponding sample pixel. The resulting image can be displayed and/or further analysed. This step may be executed by a data processing system as described below with reference to FIG. 8.

Figure 8:
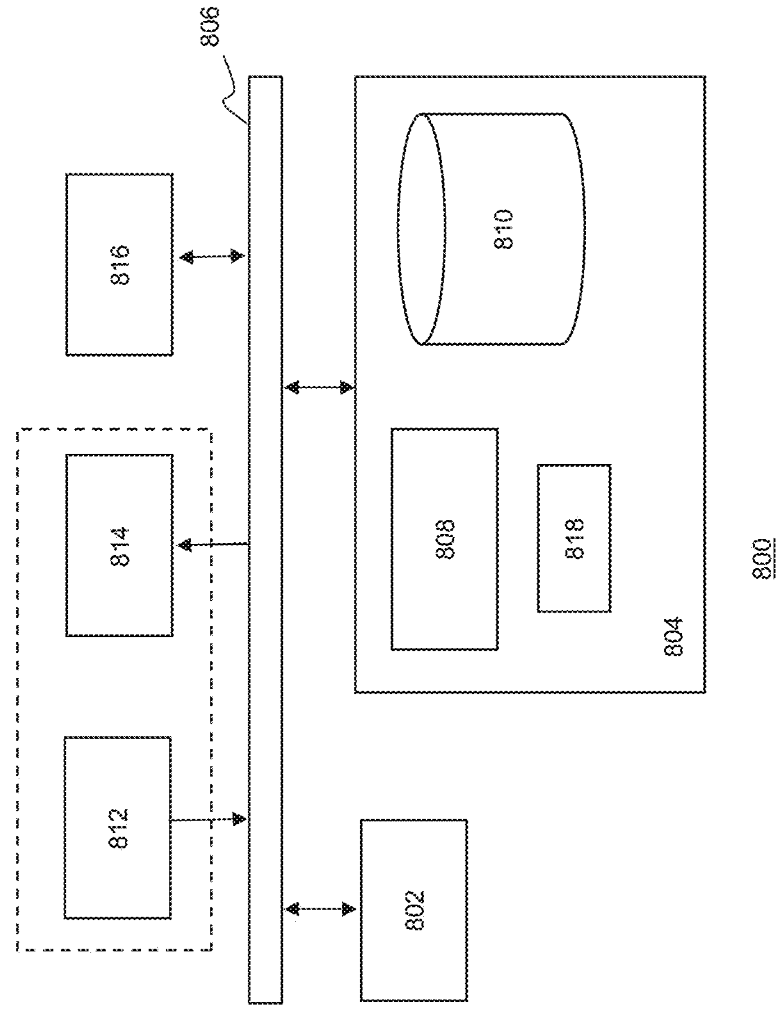

FIG. 8 is a block diagram illustrating an exemplary data processing system described in this disclosure. Data processing system 800 may include at least one processor 802 coupled to memory elements 804 through a system bus 806. As such, the data processing system may store program code within memory elements 804. Further, processor 802 may execute the program code accessed from memory elements 804 via system bus 806. In one aspect, data processing system may be implemented as a computer that is suitable for storing and/or executing program code. It should be appreciated, however, that data processing system 800 may be implemented in the form of any system including a processor and memory that is capable of performing the functions described within this specification.

Memory elements 804 may include one or more physical memory devices such as, for example, local memory 808 and one or more bulk storage devices 810. Local memory may refer to random access memory or other non-persistent memory device(s) generally used during actual execution of the program code. A bulk storage device may be implemented as a hard drive or other persistent data storage device. The processing system 800 may also include one or more cache memories (not shown) that provide temporary storage of at least some program code in order to reduce the number of times program code must be retrieved from bulk storage device 810 during execution.

Input/output (I/O) devices depicted as key device 812 and output device 814 optionally can be coupled to the data processing system. Examples of key device may include, but are not limited to, for example, a keyboard, a pointing device such as a mouse, or the like. Examples of output device may include, but are not limited to, for example, a monitor or display, speakers, or the like. Key device and/or output device may be coupled to data processing system either directly or through intervening 1/O controllers. A network adapter 816 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Operation modems, cable operation modems, and Ethernet cards are examples of different types of network adapter that may be used with data processing system 800.

As pictured in FIG. 8, memory elements 804 may store an application 818. It should be appreciated that data processing system 800 may further execute an operating system (not shown) that can facilitate execution of the application. Application, being implemented in the form of executable program code, can be executed by data processing system 800, e.g., by processor 802. Responsive to executing application, data processing system may be configured to perform one or more operations to be described herein in further detail.

In one aspect, for example, data processing system 800 may represent a client data processing system. In that case, application 818 may represent a client application that, when executed, configures data processing system 800 to perform the various functions described herein with reference to a "client". Examples of a client can include, but are not limited to, a personal computer, a portable computer, a mobile phone, or the like.

In another aspect, data processing system 800 may represent a server. For example, data processing system 800 may represent an (HTTP) server in which case application 818, when executed, may configure data processing system 800 to perform (HTTP) server operations. In another aspect, data processing system may represent a module, unit or function as referred to in this specification.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for femtosecond-pulsed microscopy, the method comprising:

repetitively selecting a burst of pulses from a pulse train comprising femtosecond laser pulses to obtain a plurality of bursts of pulses, each burst of pulses of the plurality of bursts of pulses comprising a plurality of consecutive pulses, the plurality of bursts of pulses comprising less than 25% of the pulses of the pulse train, an interval between two subsequent bursts of pulses from the plurality of bursts of pulses being at least thrice as long as a duration of a burst;

repetitively illuminating a sample with the plurality of bursts of pulses;

moving a focal spot to different positions on the sample, the sample comprising sample pixels, each sample pixel being illuminated by exactly one burst of pulses from the plurality of bursts of pulses; and, repetitively detecting interaction of the plurality of bursts of pulses with the sample to obtain a plurality of signals, each signal in the plurality of signals corresponding to the exactly one burst of pulses.

2. The method as claimed in claim 1, further comprising:

determining an image comprising image pixels, each image pixel corresponding to a corresponding sample pixel, and each image pixel having a pixel value based on the detected signal caused by the interaction of the exactly one burst of pulses with the corresponding sample pixel.

3. A microscopy system comprising:

a laser source for providing a pulse train comprising a series of femtosecond pulses;

a pulse picker for repetitively selecting a burst of pulses from the pulse train to obtain a plurality of bursts of pulses, each of the bursts of pulses of the plurality of bursts of pulses comprising a plurality of consecutive pulses, the plurality of bursts of pulses comprising less than 25% of the pulses of the pulse train, an interval between consecutive bursts of pulses of the plurality of bursts of pulses being at least thrice as long as a duration of a burst;

optics for illuminating a sample with the plurality of bursts of pulses;

a scanner for moving a focal spot to different positions on the sample, the different positions defining sample pixels on the sample, each sample pixel being illuminated by exactly one burst of pulses; and, one or more detectors for detecting one or more respective signals caused by interaction of the plurality of bursts of pulses with the sample, each of the one or more detectors being configured to generate a single signal for each of the bursts of pulses.

4. The microscopy system as claimed in claim 3, wherein the pulse picker is configurable to vary a number of pulses per burst.

5. The microscopy system as claimed in claim 3, wherein the microscopy system is configured to adjust a peak intensity per pulse.

6. The microscopy system as claimed in claim 3, wherein the pulse picker comprises an acousto-optic modulator.

7. The microscopy system as claimed in claim 3, wherein the pulse picker is configured to select a burst with 2-20 consecutive pulses.

8. The microscopy system as claimed in claim 3, wherein the plurality of bursts of pulses have an energy of at least 1 nJ per pulse measured at the sample; and wherein the plurality of bursts of pulses have an energy of at most 10 nJ per pulse measured at the sample.

9. The microscopy system as claimed in claim 3, wherein a pulse length of the pulses in the pulse train is less than or equal to 250 fs.

10. The microscopy system as claimed in claim 3, wherein the laser source has a wavelength of between 1000-1200 nm; or, wherein the laser source has a wavelength of between 700-900 nm.

11. The microscopy system as claimed in claim 3, wherein the scanner is a raster scanner for scanning a target area of the sample, the raster scanner defining a two-dimensional raster of sample pixels in the target area.

12. The microscopy system as claimed in claim 11, wherein the raster scanner comprises a galvo-scanner system or a MEMS mirror system.

13. The microscopy system as claimed in claim 11, wherein the pulse picker is configured to repetitively select bursts with a frequency of at least 0.1 MHz.

14. The microscopy system as claimed in claim 11, further comprising a controller configured to receive, for each pixel in the target area, one or more respective signals from the one or more detectors.

15. The microscopy system as claimed in claim 3, wherein at least one of the one or more detectors comprises a photo-multiplier tube.

16. The microscopy system as claimed in claim 3, wherein the one or more detectors are configured to detect at least one of a second-harmonics signal, a third-harmonics signal, an autofluorescence signal, and a multi-photon signal.

17. The microscopy system as claimed in claim 3, further comprising a controller configured to control the pulse picker, wherein the controller is synchronized with the laser source.

18. The microscopy system as claimed in claim 3, wherein at least one of the one or more detectors has a detector bandwidth that is smaller than a pulse repetition rate and larger than a burst repetition rate.

19. A non-transitory computer-readable storage medium having instructions which, when executed by a processor cause the processor to carry out a method comprising:

repetitively selecting a burst of pulses from a pulse train comprising femtosecond laser pulses to obtain a plurality of bursts of pulses, each bursts of pulses of the plurality of bursts of pulses comprising a plurality of consecutive pulses, the plurality of bursts of pulses comprising less than 25% of the pulses of the pulse train, an interval between two subsequent bursts of pulses from the plurality of bursts of pulses being at least thrice as long as a duration of a burst;

repetitively illuminating a sample with the selected plurality of bursts of pulses;

moving a focal spot to different positions on the sample, the sample comprising sample pixels, each sample pixel being illuminated by exactly one burst of pulses from the plurality of bursts of pulses; and, repetitively detecting interaction of the plurality of bursts of pulses with the sample to obtain a plurality of signals, each signal in the plurality of signals corresponding to the exactly one burst of pulses.

20. The microscopy system as claimed in claim 18, wherein the detector bandwidth is a factor 1.5-4 higher than the burst repetition rate.

* * * * *